United States Patent
Maezawa

(10) Patent No.: US 11,568,244 B2
(45) Date of Patent: Jan. 31, 2023

(54) INFORMATION PROCESSING METHOD AND APPARATUS

(71) Applicant: YAMAHA CORPORATION, Hamamatsu (JP)

(72) Inventor: Akira Maezawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 512 days.

(21) Appl. No.: 16/752,039

(22) Filed: Jan. 24, 2020

(65) Prior Publication Data

US 2020/0160821 A1 May 21, 2020

Related U.S. Application Data

(63) Continuation of application No. PCT/JP2018/027838, filed on Jul. 25, 2018.

(30) Foreign Application Priority Data

Jul. 25, 2017 (JP) .............................. JP2017-143980

(51) Int. Cl.
*G06N 3/08* (2006.01)
*G06N 3/04* (2006.01)
*G10H 1/00* (2006.01)

(52) U.S. Cl.
CPC ............. *G06N 3/08* (2013.01); *G06N 3/0454* (2013.01); *G10H 1/0066* (2013.01);
(Continued)

(58) Field of Classification Search
CPC ..... A63F 13/847; G06F 16/683; G06N 3/006; G06N 3/0454; G06N 3/0481; G06N 3/08;
(Continued)

(56) References Cited

U.S. PATENT DOCUMENTS 5,942,710 A * 8/1999 Hayakawa ............... G10H 1/38
84/669
5,990,404 A * 11/1999 Miyano ................ G10H 1/0008
84/602

(Continued)

FOREIGN PATENT DOCUMENTS

| JP | 2001159892 A | 6/2001 |
| WO | 2010095622 A1 | 8/2010 |
| WO | 2018016581 A1 | 1/2018 |

OTHER PUBLICATIONS

International Search Report issued in Intl. Appln. No PCT/JP2018/027838 dated Sep. 11, 2018. English translation provided.

(Continued)

*Primary Examiner* — Gerald Gauthier
(74) *Attorney, Agent, or Firm* — Rossi, Kimms & McDowell LLP

(57) ABSTRACT

An information processing method according to the present invention includes providing first musical piece information representing contents of a musical piece and performance information relating to a past performance prior to one unit period within the musical piece to a learner that has undergone learning relating to a specific tendency that relates to a performance, and generating, for the one unit period, performance information that is based on the specific tendency with the learner.

12 Claims, 4 Drawing Sheets

(52) U.S. Cl.
CPC ............... *G10H 2210/105* (2013.01); *G10H 2210/121* (2013.01); *G10H 2240/021* (2013.01)

(58) Field of Classification Search
CPC ........ G06N 3/088; G06N 7/005; G06N 20/10;
G06N 3/0445; G06N 5/003; G06Q 50/00;
G06V 40/23; G09B 5/06; G09B 7/04;
G09B 15/00; G09B 5/02; G10G 1/041;
G10G 1/00; G10H 1/00; G10H 1/0008;
G10H 1/0033; G10H 1/0058; G10H
1/0066; G10H 1/0091; G10H 1/26; G10H
1/361; G10H 1/368; G10H 1/38; G10H
1/383; G10H 2210/091; G10H 2210/105;
G10H 2210/121; G10H 2210/165; G10H
2210/385; G10H 2240/021; G10H
2250/311; G10H 1/0041; G10H 1/16;
G10H 1/40; G10H 1/46; G10H 3/125;
G10H 7/008; H04M 3/568
USPC ......... 84/470, 601, 602, 604, 609, 613, 616,
84/624, 635, 637; 386/343; 463/35, 36;
715/727
See application file for complete search history.

(56) References Cited

U.S. PATENT DOCUMENTS

| | | | | |
|---|---|---|---|---|
| 6,297,439 B1* | 10/2001 | Browne | ............... | G10H 1/26 |
| | | | | 84/DIG. 12 |
| 6,703,549 B1 | 3/2004 | Nishimoto | | |
| 8,278,544 B2* | 10/2012 | Humphrey | ............ | G09B 15/00 |
| | | | | 84/602 |
| 8,314,319 B2* | 11/2012 | Yokoyama | ........... | G10H 1/0066 |
| | | | | 84/649 |
| 9,767,705 B1* | 9/2017 | Klapuri | ................. | G09B 15/00 |
| 10,096,308 B1* | 10/2018 | Dick | ..................... | G10H 1/0008 |
| 11,386,912 B1* | 7/2022 | Slotznick | .............. | H04M 3/568 |
| 2004/0244567 A1* | 12/2004 | Asakura | .................. | G10G 1/00 |
| | | | | 84/613 |
| 2008/0236368 A1* | 10/2008 | Matsumoto | ......... | G10H 1/0008 |
| | | | | 84/611 |
| 2009/0255395 A1* | 10/2009 | Humphrey | ............ | G09B 15/00 |
| | | | | 84/470 R |
| 2009/0282966 A1* | 11/2009 | Walker, II | ............ | G10H 1/0008 |
| | | | | 84/616 |
| 2010/0131086 A1* | 5/2010 | Itoyama | ................. | G10H 3/125 |
| | | | | 703/2 |
| 2010/0304863 A1* | 12/2010 | Applewhite | .......... | A63F 13/847 |
| | | | | 463/43 |
| 2011/0003638 A1* | 1/2011 | Lee | ........................ | G10H 1/368 |
| | | | | 463/43 |
| 2011/0061514 A1* | 3/2011 | Yokoyama | ........... | G10H 1/0066 |
| | | | | 84/601 |
| 2011/0206354 A1* | 8/2011 | Omura | .................... | G06V 40/23 |
| | | | | 386/E5.052 |
| 2011/0271819 A1* | 11/2011 | Arimoto | ................... | G10H 1/40 |
| | | | | 84/611 |
| 2012/0046771 A1* | 2/2012 | Abe | ........................ | G10H 1/16 |
| | | | | 700/94 |
| 2012/0160079 A1* | 6/2012 | Little | .................... | G10H 1/0066 |
| | | | | 84/613 |
| 2013/0174718 A1* | 7/2013 | Maruyama | ............... | G10H 1/46 |
| | | | | 84/622 |
| 2014/0260907 A1* | 9/2014 | Matsumoto | .......... | G10H 1/0066 |
| | | | | 84/604 |
| 2014/0305287 A1* | 10/2014 | Sasaki | ................. | G10H 1/0066 |
| | | | | 84/609 |
| 2015/0046824 A1* | 2/2015 | Humphrey | ........... | G10H 1/0058 |
| | | | | 715/727 |
| 2016/0125862 A1* | 5/2016 | Takahashi | ............ | G10H 1/0033 |
| | | | | 84/602 |
| 2016/0253915 A1* | 9/2016 | Lee | ....................... | G09B 15/023 |
| | | | | 84/609 |
| 2017/0084260 A1* | 3/2017 | Watanabe | ............... | G10H 1/383 |
| 2017/0110102 A1* | 4/2017 | Colafrancesco | ....... | G10H 1/361 |
| 2017/0206869 A1* | 7/2017 | Okuyama | ........... | G10H 1/0008 |
| 2017/0287453 A1* | 10/2017 | Uemura | ............... | G10H 1/0008 |
| 2018/0341702 A1* | 11/2018 | Sawruk | .................. | G06N 5/003 |
| 2019/0156806 A1* | 5/2019 | Maezawa | ................. | G10H 1/00 |
| 2019/0156809 A1* | 5/2019 | Maezawa | ............... | G10H 1/361 |
| 2019/0236967 A1* | 8/2019 | Dohring | ................. | G09B 5/02 |
| 2019/0244539 A1* | 8/2019 | Yan | .......................... | G09B 5/06 |
| 2020/0160820 A1* | 5/2020 | Maezawa | ................. | G06N 7/005 |
| 2020/0160821 A1* | 5/2020 | Maezawa | ................. | G06N 3/088 |

OTHER PUBLICATIONS

Written Opinion issued in Intl. Appln. No. PCT/JP2018/027838 dated Sep. 11, 2018.

* cited by examiner

INFORMATION PROCESSING METHOD AND APPARATUS

TECHNICAL FIELD

The present invention relates to an information processing method, an information processing apparatus, a storage medium and a computer program that are for processing performance information relating to the performance of a musical piece.

BACKGROUND ART

Patent Literature 1, for example, discloses a technology for changing the tone of any given musical instrument to the tone of another musical instrument within the performance sound of a musical piece, by processing an acoustic signal representing the performance sound.

CITATION LIST

Patent Literature

Patent Literature 1: WO2010/095622

SUMMARY

In the actual performance of a musical piece, the performance sound is colored by tendencies (musical expressions or performance mannerisms) unique to the performers. On the other hand, existing musical piece information (e.g., MIDI data) representing the contents of a musical piece designates a standard performance of the musical piece. In order to reflect the tendencies of a performance unique to a specific performer in existing musical piece information, a professional such as a music producer needs to edit the musical piece information manually (so-called step recording), and there is a problem in that the workload involved in this process is excessive. In consideration of the above circumstances, an object of the present invention is to generate performance information that occurs when a musical piece represented by musical piece information is performed based on a specific tendency.

In order to solve the above problems, an information processing method according to a favorable mode of the present invention includes providing first musical piece information representing contents of a musical piece and performance information relating to a past performance prior to one unit period within the musical piece to a learner that has undergone learning relating to a specific tendency that relates to a performance, and generating, for the one unit period, performance information that is based on the specific tendency with the learner.

An information processing apparatus according to a favorable mode of the present invention includes a storage unit that stores first musical piece information representing contents of a musical piece and a control unit, the control unit being configured to execute of providing the first musical piece information and performance information relating to a past performance prior to one unit period within the musical piece to a learner that has undergone learning relating to a specific tendency that relates to a performance, and generating, for the one unit period, performance information that is based on the specific tendency with the learner.

A storage medium according to a favorable mode of the present invention is a non-transitory storage medium storing a program readable by a computer, configured to cause the computer to execute providing first musical piece information representing contents of a musical piece and performance information relating to a past performance prior to one unit period within the musical piece to a learner in which a specific tendency relating to a performance is reflected, and generating, for the one unit period, performance information that is based on the specific tendency with the learner.

A program according to a favorable mode of the present invention causes a computer to execute providing first musical piece information representing contents of a musical piece and performance information relating to a past performance prior to one unit period within the musical piece to a learner that has undergone learning relating to a specific tendency that relates to a performance, and generating, for the one unit period, performance information that is based on the specific tendency with the learner.

An information processing method according to a favorable mode of the present invention is the information processing method of processing first musical piece information representing contents of a musical piece, which is dividable as a plurality of segments each with a predetermined duration, using a controller including at least one neural network, the method comprising: inputting, during a current segment, among the plurality of segments, of the first musical piece information and past performance information of at least one previous segment to the at least one neural network that has undergone learning relating to a specific performance tendency of the at least one previous segment; and generating current performance information of the current segment relating to the specific performance tendency of the current segment based on at least the past performance information.

An information processing apparatus according to a favorable mode of the present invention includes a storage device storing first musical piece information representing contents of a musical piece, which is dividable as a plurality of segments each with a predetermined duration; and a controller including at least one neural network configured to: provide, during a current segment, among the plurality of segments, of the first musical piece information and past performance information of at least one previous segment to the at least one neural network that has undergone learning relating to a specific performance tendency of the at least one previous segment; and generate current performance information of the current segment relating to the specific performance tendency of the current segment based on at least the past performance information.

A non-transitory storage medium according to a favorable mode of the present invention is the non-transitory storage medium storing a program executable by a computer to execute a method of processing first musical piece information representing contents of a musical piece, which is dividable as a plurality of segments each with a predetermined duration, the method comprising: inputting, during a current segment, among the plurality of segments, of the first musical piece information and past performance information of at least one previous segment to the at least one neural network that has undergone learning relating to a specific performance tendency of the at least one previous segment; and generating current performance information for the current segment relating to the specific performance tendency of the current segment based on at least the past performance information.

DESCRIPTION OF EMBODIMENTS

First Embodiment

Figure 1:
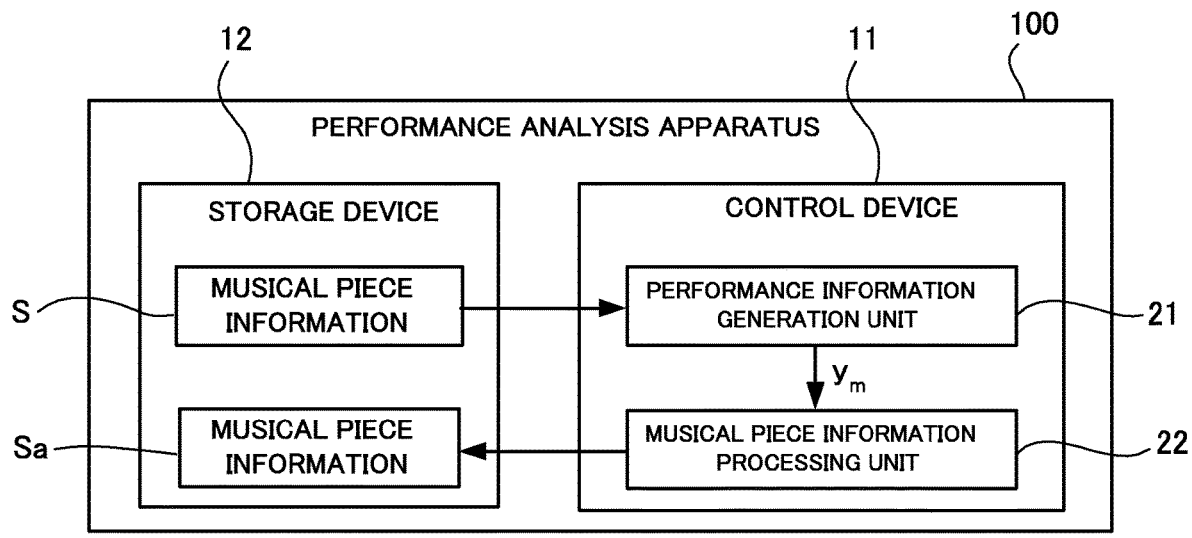
FIG. 1 is a block diagram showing a configuration of an information processing apparatus according to a first embodiment of the present invention.

FIG. 1 is a block diagram showing the configuration of an information processing apparatus 100 according to a first embodiment of the present invention. As illustrated in FIG. 1, the information processing apparatus 100 of the first embodiment is realized by a computer system equipped with a control device (control unit) 11 and a storage device (storage unit) 12. Various types of devices such as a personal computer, for example, can be utilized as the information processing apparatus 100.

The control device 11 includes a processing circuit such as a CPU (Central Processing Unit), for example. The control device 11 is realized by a single or multiple chips (processors), for example. The storage device 12 stores a computer program that is executed by the control device 11 and various types of data that are used by the control device 11. For example, a known recording medium such as a semiconductor recording medium or magnetic recording medium or a combination of multiple types of recording media can be freely employed as the storage device 12.

The storage device 12 of the present embodiment stores musical piece information S representing the contents of a musical piece. This musical piece information S (first musical piece information) designates the pitch, intensity and sounding period (sounding time and continuation length) for each of a plurality of notes constituting the musical piece. The musical piece information S can be configured in various forms, and a favorable example of the musical piece information S is, for example, a file (SMF: Standard MIDI File) in MIDI (Musical Instrument Digital Interface) format in which instruction data that designates the pitch and intensity and instructs sounding or silencing and time data that designates the sounding time point of each instruction data are arrayed in time series.

Figure 2:
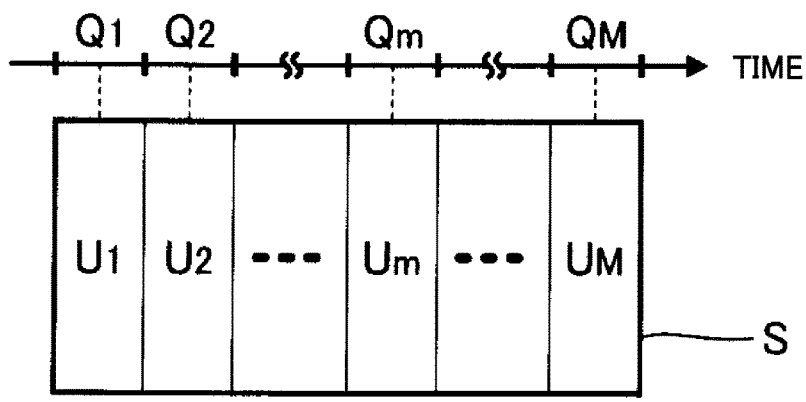
FIG. 2 is a schematic diagram of musical piece information and unit information.

As illustrated in FIG. 2, the musical piece information S is divided into a plurality (M) of portions (hereinafter, "unit information") $U_1$ to $U_M$. Any one piece of unit information $U_m$ (m=1 to M) designates the contents of the performance within an mth unit period $Q_m$ out of M unit periods $Q_1$ to $Q_M$ obtained by dividing the musical piece along the time axis. That is, the unit information $U_m$ designates the pitch, intensity and sounding period for each of one or more notes included in the unit period $Q_m$ of the musical piece. Each unit period $Q_m$ is a period of a duration corresponding to a predetermined note value (e.g., quaver) of the musical piece, for example.

The information processing apparatus 100 generates musical piece information Sa (second musical piece information) obtained by imparting a specific tendency (hereinafter, "target tendency") relating to a performance to the musical piece information S. The target tendency is, for example, a musical expression or performance mannerism unique to a specific performer. As illustrated in FIG. 1, the control device 11 of the present embodiment functions as a plurality of elements (performance information generation unit 21 and musical piece information processing unit 22) for generating the musical piece information Sa from the musical piece information S, by executing the program stored in the storage device 12. Note that some of the functions of the control device 11 may be realized by a dedicated electronic circuit.

The performance information generation unit 21 generates performance information $y_m$ that occurs when a musical piece is performed based on a target tendency. The performance information $y_m$ is a variable relating to a tendency of the performance of the musical piece. In the first embodiment, performance speed is illustrated as the performance information $y_m$. The performance information $y_m$ is, however, not limited thereto, and can also be configured as performance intensity or the like. The performance information $y_m$ is sequentially generated for every unit period $Q_m$. That is, the performance information $y_m$ can change every unit period $Q_m$.

The musical piece information processing unit 22 of FIG. 1 generates the musical piece information Sa by reflecting the performance information $y_m$ generated by the performance information generation unit 21 for every unit period $Q_m$ in the musical piece information S. Specifically, the musical piece information processing unit 22 generates the musical piece information Sa by editing the musical piece information S, such that the performance speed of the performance that is designated for each unit period $Q_m$ by the musical piece information S is changed to the performance speed designated by the performance information $y_m$ of the unit period $Q_m$. That is, the musical piece information processing unit 22 functions as an element that adds the target tendency of the performance by the specific performer to the musical piece information S.

Figure 3:
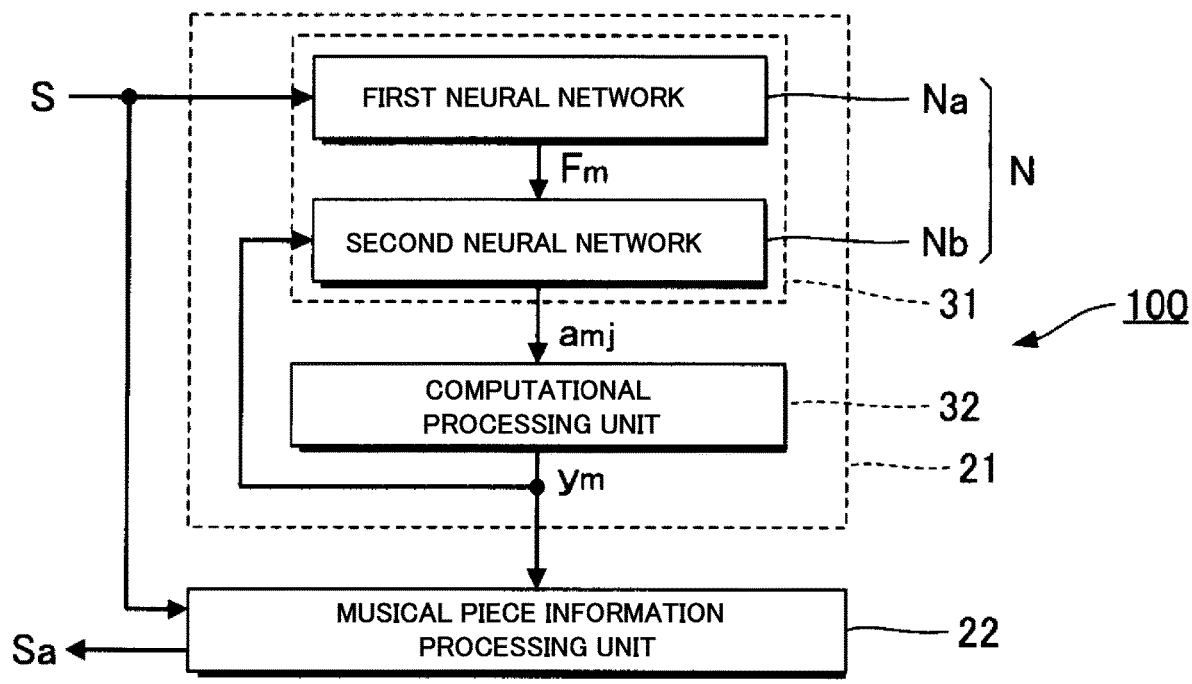
FIG. 3 is a block diagram showing a functional configuration of the information processing apparatus.

FIG. 3 is a block diagram showing a functional configuration of the information processing apparatus 100. In FIG. 3, the case where the performance information $y_m$ is generated for the mth unit period $Q_m$ within the musical piece is assumed. As illustrated in FIG. 3, the performance information generation unit 21 of the first embodiment is equipped with a coefficient specification unit 31 and a computational processing unit 32.

The performance information $y_m$ of the first embodiment is generated by an autoregressive process represented by the following equation (1)

$$y_m = \sum_{j=1}^{P} a_{mj} y_{m-j} \tag{1}$$

The coefficient specification unit 31 in FIG. 3 generates a linear predictor coefficient (autoregressive coefficient) $a_{mj}$ of the unit period $Q_m$ from the musical piece information S. The coefficient specification unit 31 of the first embodiment includes a neural network (learner) N in which the target tendency is reflected. The neural network N is a mathematical model in which a model parameter θ (θa, θb) is set by machine learning that utilizes a large amount of training data that aligns with the target tendency. Specifically, the model parameter θ is set such that the error between the performance information $y_m$ that is calculated by equation (1) and performance information (training data) representing a performance that aligns with the target tendency is minimized. Accordingly, the neural network N of the first embodiment outputs a linear predictor coefficient $a_{mj}$ ($a_{m1}$, $a_{m2}$, $a_{m3}$, ..., $a_{mP}$) appropriate for the musical piece information S based on the target tendency that is extracted from the large amount of training data utilized in the machine learning.

That is, this neural network N learns using training data that is based on the performance by a predetermined performer, so as to be able to predict (output) the performance information $y_m$ of the unit period $Q_m$, from the musical piece information S and the performance information of at least one past unit period $Q_m$ or more prior to the unit period $Q_m$. Note that training data can be generated by various methods, and can, for example, be generated, based on a performance by one specific performer, a performance by a specific performer (or typical performer) in a musical piece of a specific genre, or the like.

As illustrated in FIG. 3, the neural network N of the first embodiment is constituted by a first neural network (first learner) Na and a second neural network (second learner) Nb. The first neural network Na and the second neural network Nb are, for example, both convolutional neural networks (CNN) in which batch normalization layers and fully connected layers are connected to a stack of a plurality of layers including convolutional layers and maximum pooling layers. A Leaky ReLU (Rectified Linear Unit) is suitable for the activating function. The structure of the neural network N (Na, Nb) and the type of activating function are, however, not particularly limited.

The first neural network Na, as illustrated in FIG. 3, generates feature information $F_m$ of the unit period $Q_m$ (example of one unit period, (a segment)) from the musical piece information S in order to generate the linear predictor coefficient $a_{mj}$. Specifically, the first neural network Na generates the feature information $F_m$ of the unit period $Q_m$ from plural (2W+1) pieces of unit information $U_{m-w}$ to $U_{m+w}$ corresponding to an analysis period $A_m$ including the unit period $Q_m$, with the musical piece information S as an input. The analysis period $A_m$ is a period from a past (prior) unit period $Q_{m-w}$ of the unit period $Q_m$ to a later unit period $Q_{m+w}$.

Figure 4:
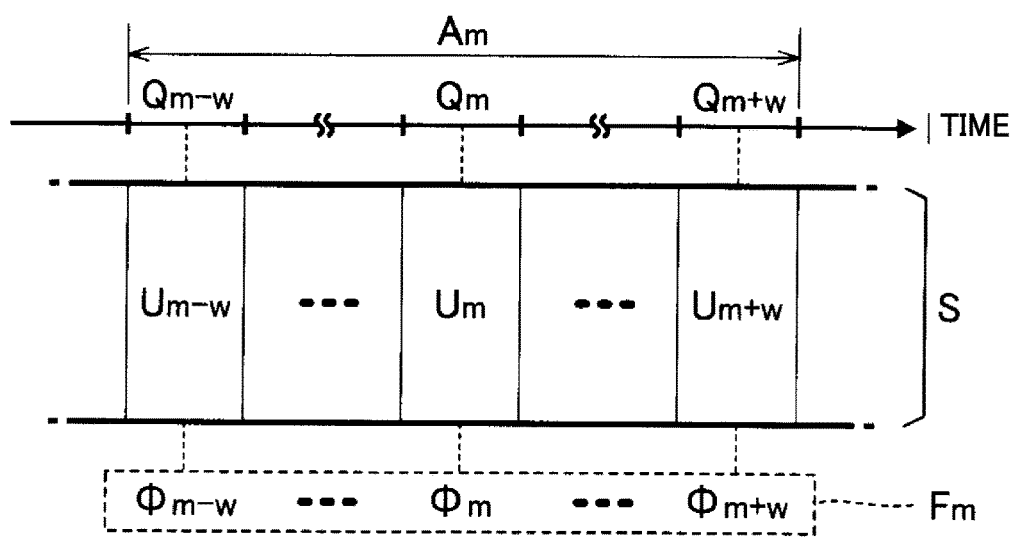
FIG. 4 is an illustrative diagram of feature information.

As illustrated in FIG. 4, the feature information $F_m$ is a series of a plurality of feature amounts $\varphi_{m-w}$ to $\varphi_{m+w}$ respectively corresponding to plural pieces of unit information $U_{m-w}$ to $U_{m+w}$ within the analysis period $A_m$. The model parameter θa of the first neural network Na is set by machine learning that utilizes a large amount of training data including feature information and a time series of plural pieces of unit information. Accordingly, the first neural network Na outputs feature information $F_m$ appropriate for the plural pieces of unit information $U_{m-w}$ to $U_{m+w}$ based on the tendency that is extracted from the large amount of training data. The feature information $F_m$ is equivalent to information that summarizes the musical features of the performance contents within the analysis period $A_m$. Specifically, feature information $F_m^k$ representing various types of musical expressions is generated in addition to a time series of notes within the musical piece. As musical expressions (contexts) that are reflected in the feature information $F_m^k$, a key signature within the musical piece, the position of a beat point, a dynamic marking (e.g., crescendo) and a tempo marking (e.g., ritardando) are given as examples.

The second neural network Nb in FIG. 3 outputs the linear predictor coefficient $a_{mj}$ of the unit period $Q_m$, with the feature information $F_m$ generated by the first neural network Na and P pieces of performance information $y_{m-1}$ to $y_{m-P}$ (where P is a natural number of 2 or more) of a period prior to the unit period $Q_m$ as inputs. The model parameter θb of the second neural network Nb is set by machine learning that utilizes a large amount of training data including a linear predictor coefficient and a vector that includes feature information and a time series of plural pieces of performance information. Accordingly, the second neural network Nb outputs a linear predictor coefficient $a_{mj}$ appropriate for the P pieces of performance information $y_{m-1}$ to $y_{m-P}$ and the feature information $F_m$ based on the target tendency that is extracted from the large amount of training data. That is, the second neural network Nb has learned, such that the tendency of the performance of the predetermined performer is included in the linear predictor coefficient $a_{mj}$ that serves as an output.

The computational processing unit 32 generates the performance information $y_m$ of the unit period $Q_m$, by executing the computation of the aforementioned equation (1) for the linear predictor coefficient $a_{mj}$ generated by the coefficient specification unit 31 and the past P pieces of performance information $y_{m-1}$ to $y_{m-P}$. In this way, in the first embodiment, the performance information $y_m$ of the unit period $Q_m$ is output, based on the past P pieces of performance information $y_{m-1}$ to $y_{m-P}$ prior to the unit period $Q_m$, and the output performance information $y_m$ is fed back as an input of the second neural network Nb. That is, the performance information $y_{m+1}$ of the next unit period $Q_{m+1}$ is predicted by the second neural network Nb, based on the performance information $y_m$ to $y_{m-P}$ to which the performance information $y_m$ has been added. This processing is then successively repeated.

As is clear from the above description, the performance information generation unit 21 of the first embodiment, generates, for the unit period $Q_m$, performance information $y_m$ in which the target tendency is reflected, by providing the musical piece information S (plural pieces of unit information $U_{m-w}$ to $U_{m+w}$) and the past P pieces of performance information $y_{m-1}$ to $y_{m-P}$ to the neural network N. Processing for generating the performance information $y_m$ from the feature information $F_m$ corresponding to the unit period $Q_m$ and the past P pieces of performance information $y_{m-1}$ to $y_{m-P}$ is sequentially executed in time-series order for each of the M unit periods $Q_1$ to $Q_M$ within the musical piece. The time series of M pieces of performance information $y_1$ to $y_M$ generated with the above processing is equivalent to the temporal change in performance speed that occurs when the musical piece is performed based on the target tendency.

Figure 5:
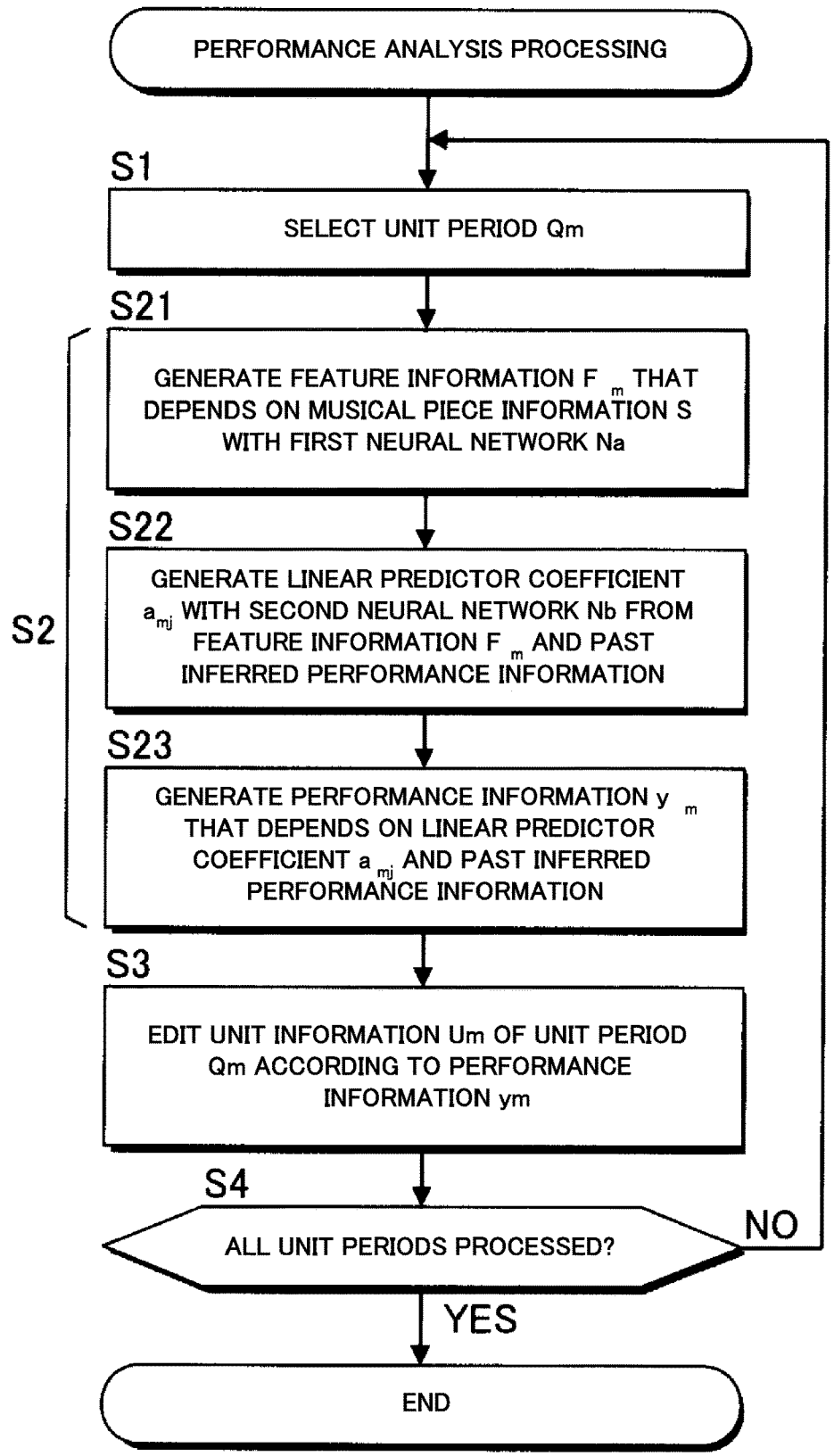
FIG. 5 is a flowchart showing the contents of musical piece information editing.

FIG. 5 is a flowchart illustrating the contents of processing (hereinafter, "musical piece information editing") in which the control device 11 generates the musical piece information Sa from the musical piece information S. The musical piece information editing of FIG. 5 is started when triggered by an instruction from a user to the information processing apparatus 100, for example. When the musical piece information editing is started, the performance information generation unit 21 selects the earliest unselected unit period $Q_m$ among the M unit periods $Q_1$ to $Q_M$ within the musical piece (S1).

The performance information generation unit 21 generates the performance information $y_m$ of the unit period $Q_m$, by providing the musical piece information S and the past P pieces of performance information $y_{m-1}$ to $y_{m-P}$, to the neural network N (S2). Note that at the stage at which the first unit period $Q_1$ within the musical piece is selected as the earliest unselected unit period, performance information $y_0$ prepared as an initial value is provided to the neural network N together with the musical piece information S.

Specifically, the coefficient specification unit 31 of the performance information generation unit 21 generates, with the first neural network Na, feature information $F_m$ that depends on the plural pieces of unit information $U_{m-w}$ to $U_{m+w}$ corresponding to the analysis period $A_m$ surrounding the unit period $Q_m$ within the musical piece information S (S21). The coefficient specification unit 31 generates, with the second neural network Nb, a linear predictor coefficient $a_{mj}$ that depends on the feature information $F_m$ and the past P pieces of performance information $y_{m-1}$ to $y_{m-P}$ (S22). The computational processing unit 32 then generates the performance information $y_m$ of the unit period $Q_m$ from the linear predictor coefficient $a_{mj}$ and the past P pieces of performance information $y_{m-1}$ to $y_{m-P}$ (S23).

The musical piece information processing unit 22 reflects the performance information $y_m$ generated by the performance information generation unit 21 in the unit information $U_m$ of the unit period $Q_m$ within the musical piece information S (S3). The control device 11 determines whether the above processing (S1 to S3) has been completed for all (M) of the unit periods $Q_1$ to $Q_M$ within the musical piece (S4). If there is an unprocessed unit period $Q_m$ (S4: NO), the performance information generation unit 21 newly selects the unit period $Q_{m+1}$ immediately after the unit period $Q_m$ that is selected at the current point in time (S1), and executes generation of the performance information $y_m$ (S2) and editing of the unit information $U_m$ (S3). On the other hand, when processing is completed for all the unit periods $Q_1$ to $Q_M$ within the musical piece (S4: YES), the control device 11 ends the musical piece information editing of FIG. 5. At the point in time at which the musical piece information editing is ended, musical piece information Sa in which the target tendency is reflected for the M unit periods $Q_1$ to $Q_M$ of the musical piece is generated.

As described above, in the first embodiment, performance information $y_m$ that occurs when the unit period $Q_m$ of the musical piece is performed based on a target tendency can be generated (predicted), by providing the musical piece information S and the past P pieces of performance information $y_{m-1}$ to $y_{m-P}$ to the neural network N in which the target tendency is reflected. In the first embodiment, pieces of performance information $y_m$ are sequentially generated for each of the M unit periods $Q_1$ to $Q_M$ within the musical piece. Also, the performance information $y_m$ is generated according to the linear predictor coefficient $a_{mj}$ generated by the neural network N and the past P pieces of performance information $y_{m-1}$ to $y_{m-P}$, and thus there is an advantage in that the performance information $y_m$ can be generated with a simple computation.

In the first embodiment, the first neural network Na that generates the feature information $F_m$ from the musical piece information S and the second neural network Nb that generates the linear predictor coefficient $a_{mj}$ from the feature information $F_m$ and the past P pieces of performance information $y_{m-1}$ to $y_{m-P}$ are utilized. Accordingly, there is an advantage in that appropriate performance information $y_m$ reflecting the past P pieces of performance information $y_{m-1}$ to $y_{m-P}$ can be generated.

Second Embodiment

A second embodiment of the present invention will now be described. Note that, in the embodiments illustrated below, signs used in the description of the first embodiment will be used for elements whose operation or function is similar to the first embodiment, and a detailed description of those elements will be omitted as appropriate.

Figure 6:
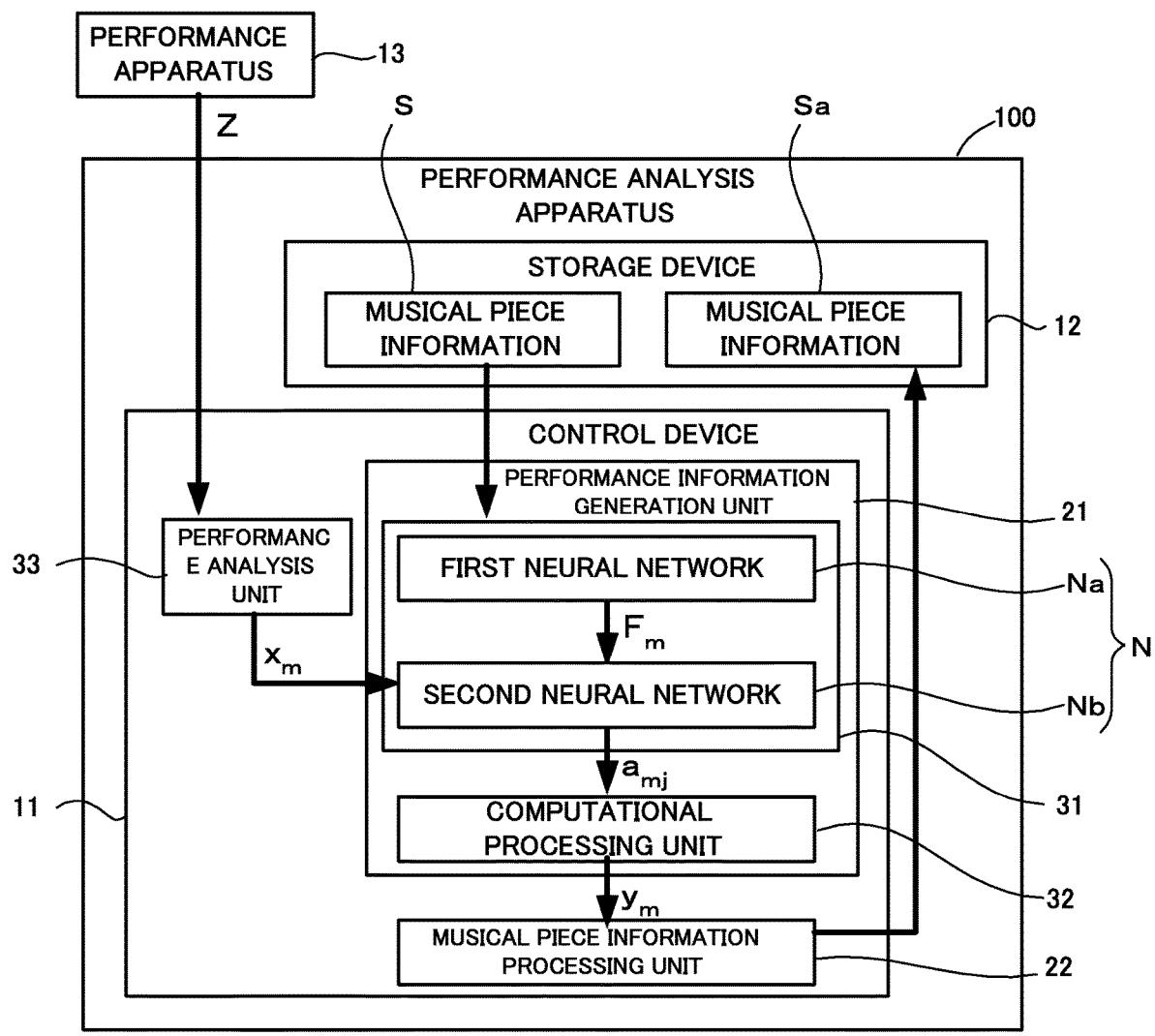
FIG. 6 is a block diagram showing a functional configuration of an information processing apparatus according to a second embodiment.

FIG. 6 is a block diagram showing a specific configuration of a performance information processing apparatus 100 in the second embodiment. As illustrated in FIG. 6, the performance information generation unit 21 of the second embodiment is equipped with a performance analysis unit 33 apart from a coefficient specification unit 31 and computational processing unit 32 similar to the first embodiment. The performance analysis unit 33 is realized by the control device 11 executing a program stored in the storage device 12, similarly to the coefficient specification unit 31 and the computational processing unit 32.

A performance apparatus 13 is connected to the performance information processing apparatus 100 of the second embodiment. The performance apparatus 13 is an input device that is utilized by a user in performing a musical piece. For example, a keyboard instrument-type performance device (e.g., MIDI instrument) in which a plurality of keys that are operated by the user are arrayed can be favorably utilized. The performance apparatus 13 sequentially outputs instruction information Z in conjunction with an operation by the user. The instruction information Z is generated for each of the plurality of notes constituting the musical piece, and is data (e.g., MIDI event data) that designates the pitch and intensity of the notes and instructs sounding or silencing.

The performance analysis unit 33 generates performance information $x_m$ ($x_1$ to $x_M$) from the time series of plural pieces of instruction information Z that is supplied by the performance apparatus 13. The performance information $x_m$ is a variable relating to a tendency of the performance of the musical piece, similarly to the performance information $y_m$. Specifically, various types of variables relating to a musical expression that can differ by performer, such as the performance speed or performance intensity of the musical piece, for example, are favorable examples of the performance information $x_m$. The performance information $x_m$ is sequentially generated for every unit period $Q_m$ of the musical piece.

In the aforementioned first embodiment, the past P pieces of performance information $y_{m-1}$ to $y_{m-P}$ prior to the unit period $Q_m$ are fed back in order to generate the performance information $y_m$. In the second embodiment, the past P pieces of performance information $x_{m-1}$ to $x_{m-P}$ prior to the unit period $Q_m$ are supplied to the performance information generation unit 21 (coefficient specification unit 31). The coefficient specification unit 31 generates, for the unit period $Q_m$, performance information $y_m$ in which the target tendency is reflected, by providing the musical piece information S (plural pieces of unit information $U_{m-w}$ to $U_{m+w}$ within the analysis period $A_m$) and the past P pieces of performance information $x_{m-1}$ to $x_{m-P}$ to the neural network N.

Assuming the case where the performer of the performance corresponding to the target tendency operates the performance apparatus 13, the performance information $y_m$ that is generated from the P pieces of performance information $x_{m-1}$ to $x_{m-P}$ corresponds to a performance that is predicted to be executed by the performer in the unit period $Q_m$. That is, with the performance information generation unit 21 of the second embodiment, it is possible to predict the performance information $y_m$ relating to the performance by the performer in the unit period $Q_m$, by providing the musical piece information S and the past P pieces of performance information $x_{m-1}$ to $x_{m-P}$ to the neural network N. In other words, the performance information $y_m$ of the next unit period $Q_m$ can be predicted from the performance information $x_{m-1}$ to $x_{m-P}$ of the performance up to that point and the musical piece information S.

The following effects can thereby be obtained. For example, when driving another apparatus such as a video apparatus or a lighting apparatus in synchronization with the performance of the performance apparatus 13, the performance information $y_m$ relating to the predicted performance speed can be provided to the other apparatus. Thus, the other apparatus is able to display video or control lighting, based on the predicted performance speed. Accordingly, when synchronizing a performance with another apparatus, the occurrence of delays in driving the other apparatus can be prevented.

Variations

Illustrated below are modes of specific variations that are appended to the modes illustrated above. Two or more modes freely selected from those illustrated below may be combined as appropriate as long as there are no mutual inconsistencies.

(1) In the aforementioned embodiments, the unit information $U_m$ of the musical piece is edited every time the performance information $y_m$ is generated (S3), but M pieces of performance information $y_1$ to $y_M$ may be generated for the entire segment of the musical piece, and the entirety of the musical piece information S may then be edited utilizing the M pieces of performance information $y_1$ to $y_M$.

(2) In the aforementioned embodiments, the analysis period $A_m$ centered on the unit period $Q_m$ is illustrated, but the relationship between the unit period $Q_m$ and the analysis period $A_m$ is not limited to that illustrated above. The number of unit periods within the analysis period $A_m$ that are located prior to the unit period $Q_m$ may be different from the number of unit periods located thereafter.

(3) In the aforementioned embodiments, the performance information $y_m$ generated by the performance information generation unit 21 is utilized in editing the musical piece information S, but the performance information $y_m$ may be used in editing the musical piece information S after having been smoothed along the time axis. For example, a configuration is envisaged in which the moving average of a predetermined number of pieces of performance information including the performance information $y_m$ of the unit period $Q_m$ is calculated as definitive performance information $Y_m$, and the performance information $Y_m$ is utilized in editing the musical piece information S. Also, standard performance information $y_{REF}$, for example, may be held in the storage device 12, and the weighted sum of the performance information $y_m$ generated by the performance information generation unit 21 and the standard performance information $y_{REF}$ may be used as the definitive performance information $Y_m$ in editing the musical piece information S, as represented by the following equation (2). Note that a coefficient a in equation (2) is set to an appropriate positive number less than 1.

$$Y_m = \alpha y_m + (1-\alpha) y_{REF} \quad (2)$$

(4) It is also possible, for example, to realize the information processing apparatus 100 using a server apparatus that communicates with a terminal apparatus (e.g., mobile phone or smartphone) via a communication network such as a mobile communication network or the Internet. Specifically, the information processing apparatus 100 generates musical piece information Sa by musical piece information editing (FIG. 5) performed on musical piece information S received from the terminal apparatus, and transmits the musical piece information Sa to the terminal apparatus.

Also, the performance information $y_m$ generated by the performance information generation unit 21 may be transmitted to the terminal apparatus, and processing for generating the musical piece information Sa from the musical piece information S may be executed in the terminal apparatus. That is, the musical piece information processing unit 22 can be omitted from the information processing apparatus 100.

(5) In the aforementioned embodiments, the performance speed of the musical piece is illustrated as the performance information $y_m$, but the variable that is represented by the performance information $y_m$ is not limited to that illustrated above. For example, any variable relating to a musical expression that can differ by performer, such as the performance intensity of the musical piece, can be utilized as the performance information $y_m$. The performance information $x_m$ is similarly not limited to performance speed. That is, various types of variables (e.g., performance intensity) relating to musical expressions can be utilized as the performance information $x_m$.

(6) In the above embodiments, the neural network N is divided in two, but can also be used as one. That is, the performance information $y_m$ of the next unit period $Q_m$ can also be predicted with one neural network N, from the musical piece information S and the past performance information $y_{m-1}$ to $y_{m-P}$ (or performance information $x_{m-1}$ to $x_{m-P}$). Also, the first neural network Na is used in order to extract the feature information $F_m$ from the musical piece information S, but the feature information $F_m$ can also be extracted by analyzing the musical piece information S, without using a neural network.

(7) In the above embodiments, the performance information $y_m$ of the unit period $Q_m$ is predicted by using a neural network, but a learner constituted by a support vector machine, a self-organizing map or a learner that learns by reinforcement learning, for example, can be used as the learner that performs such prediction, apart from the above neural network.

(8) In the above embodiments, the musical piece information S is stored in the storage device 12 of the information processing apparatus 100, and, in this case, the storage device 12 is constituted by a HDD, SSD or the like. On the other hand, the musical piece information S can also be received from an apparatus external to the information processing apparatus 100. In this case, the received musical piece information S may be temporarily stored in a memory or the like, other than the HDD or the like of the information processing apparatus 100. Accordingly, the storage device of the present invention may be constituted by a memory.

(9) The following configurations, for example, can be appreciated from the embodiments illustrated above.

Mode 1

An information processing method according to a favorable mode (mode 1) of the present invention, as a result of musical piece information representing contents of a musical piece and performance information relating to a past performance relative to one unit period within the musical piece being provided by a computer to a neural network in which a specific tendency relating to a performance is reflected, generates, for the one unit period, performance information based on the specific tendency. According to the above mode, performance information that occurs when a unit period within a musical piece is performed based on a target tendency can be generated, by providing musical piece information and plural pieces of past performance information to a neural network.

Mode 2

In a favorable example (mode 2) of mode 1, in generation of the performance information, by providing, for each of a plurality of unit periods within the musical piece, the musical piece information and performance information generated, by the neural network, for two or more past unit periods relative to the unit period to the neural network, the performance information is sequentially generated. According to the above mode, performance information can be generated for each of a plurality of unit periods within the musical piece.

Mode 3

In a favorable example (mode 3) of mode 1 or 2, in generation of the performance information, a linear predictor coefficient is specified, for the one unit period, by the neural network, and performance information of the one unit period is specified, according to the linear predictor coefficient and the performance information relating to the past performance relative to the one unit period. In the above mode, performance information is specified according to a linear predictor coefficient specified by a neural network and plural pieces of past performance information, and thus there is an advantage in that performance information can be specified by a simple computation.

Mode 4

In a favorable example (mode 4) of mode 3, the musical piece information is divided into plural pieces of unit information corresponding to different unit periods within the musical piece, and the neural network includes a first neural network that generates, from the unit information of each unit period within an analysis period that includes the one unit period, feature information representing a feature within the analysis period, and a second neural network that specifies, from the feature information generated for every unit period by the first neural network and the performance information according to the past performance relative to the one unit period, the linear predictor coefficient for the one unit period. In the above mode, a first neural network that specifies feature information from musical piece information and a second neural network that specifies a linear predictor coefficient from feature information and plural pieces of past performance information are utilized. Accordingly, there is an advantage in that appropriate performance information reflecting plural pieces of past performance information can be generated.

Mode 5

In a favorable example (mode 5) of mode 1, in generation of the performance information, by providing the musical piece information and performance information relating to a past performance of a user relative to the one unit period to the neural network, performance information relating to the performance of the user in the one unit period is predicted. According to the above mode, performance information relating to the performance of a user can be predicted, by providing musical piece information and plural pieces of past performance information to a neural network.

Mode 6

A computer program according to a favorable mode (mode 6) of the present invention, by providing musical piece information representing contents of a musical piece and performance information relating to a past performance relative to one unit period within the musical piece to a neural network in which a specific tendency relating to the performance is reflected, causes a computer to function as a performance information generation unit that generates, for the one unit period, performance information based on the specific tendency. According to the above mode, performance information that occurs when a unit period within a musical piece is performed based on a target tendency can be generated, by providing musical piece information and plural pieces of past performance information to a neural network.

The program according to mode 6 is provided in the form of storage in a computer-readable recording medium and is installed on a computer, for example. The recording medium is, for example, a non-transitory recording medium, favorable examples of which include an optical recording medium (optical disk) such as a CD-ROM, and can encompass recording media of any known format such as a semiconductor recording medium or a magnetic recording medium. Note that non-transitory recording media include any recording media excluding transitory propagating signals, and do not preclude volatile recording media. Also, the program may be provided to a computer in the form of distribution via a communication network.

REFERENCE SIGNS LIST

100 Information processing apparatus
11 Control apparatus
12 Storage apparatus
13 Performance apparatus
21 Performance information generation unit
22 Musical piece information processing unit
31 Coefficient specification unit
32 Computational processing unit
33 Performance analysis unit

The invention claimed is:

1. An information processing method of processing first musical piece information representing contents of a musical piece, which is dividable as a plurality of segments each with a predetermined duration, using a controller including at least one neural network, the method comprising:
   inputting, during a current segment, among the plurality of segments, the first musical piece information and past performance information of at least one previous segment to the at least one neural network that has undergone learning relating to a specific performance tendency of the at least one previous segment; and
   generating current performance information of the current segment relating to the specific performance tendency of the current segment based on at least the past performance information,
   wherein the generating of the current performance information generates the current performance information based on another musical piece information performed by a performer and the past performance information of the performer, to predict the current performance information of the current segment.

2. The information processing method according to claim 1, wherein the generating of the current performance information provides, for each of the plurality of segments, the first musical piece information and the past performance information of a plurality of previous segments to sequentially generate each current performance information as time progresses.

3. The information processing method according to claim 1, wherein the generating of the current performance information includes:
   generating a linear predictor coefficient of the current segment; and
   generating the current performance information according to the generated linear predictor coefficient and the past performance information.

4. The information processing method according to claim 3, wherein the at least one neural network includes:
- a first neural network that generates, during a predetermined analysis period, feature information for each of the plurality of segments; and
- a second neural network that generates the linear predictor coefficient of the current segment from the generated feature information of the current segment and the past performance information.

5. The information processing method according to claim 1, wherein the controller includes a processor.

6. An information processing method of processing first musical piece information representing contents of a musical piece, which is dividable as a plurality of segments each with a predetermined duration, using a controller including at least one neural network, the method comprising:
- inputting, during a current segment, among the plurality of segments, the first musical piece information and past performance information of at least one previous segment to the at least one neural network that has undergone learning relating to a specific performance tendency of the at least one previous segment;
- generating current performance information of the current segment relating to the specific performance tendency of the current segment based on at least the past performance information; and
- generating second musical piece information obtained by reflecting the generated current performance information in the first musical piece information for each of the plurality of segments.

7. An information processing apparatus comprising:
- a storage device storing first musical piece information representing contents of a musical piece, which is dividable as a plurality of segments each with a predetermined duration; and
- a controller including at least one neural network configured to:
  - provide, during a current segment, among the plurality of segments, the first musical piece information and past performance information of at least one previous segment to the at least one neural network that has undergone learning relating to a specific performance tendency of the at least one previous segment; and
  - generate current performance information of the current segment relating to the specific performance tendency of the current segment based on at least the past performance information,
- wherein, the controller generates the current performance information based on another musical piece information performed by a performer and the past performance information of the performer, to predict the current performance information of the current segment.

8. The information processing apparatus according to claim 7, wherein the controller, in generating the current performance information, provides, for each of the plurality of segments, the first musical piece information and the past performance information of a plurality of previous segments to sequentially generate each current performance information as time progresses.

9. The information processing apparatus according to claim 7, wherein the controller is configured to, in generating the current performance information:
- generate a linear predictor coefficient of the current segment; and
- generate the current performance information according to the generated linear predictor coefficient and the past performance information.

10. The information processing apparatus according to claim 9, wherein the at least one neural network includes:
- a first neural network that generates, during a predetermined analysis period, feature information for each of the plurality of segments; and
- a second neural network that generates the linear predictor coefficient of the current segment from the generated feature information of the current segment and the past performance information.

11. The information processing apparatus according to claim 7, wherein the controller includes a processor.

12. An information processing apparatus comprising:
- a storage device storing first musical piece information representing contents of a musical piece, which is dividable as a plurality of segments each with a predetermined duration; and
- a controller including at least one neural network configured to:
  - provide, during a current segment, among the plurality of segments, the first musical piece information and past performance information of at least one previous segment to the at least one neural network that has undergone learning relating to a specific performance tendency of the at least one previous segment;
  - generate current performance information of the current segment relating to the specific performance tendency of the current segment based on at least the past performance information; and
  - generate second musical piece information obtained by reflecting the generated current performance information in the first musical piece information for each of the plurality of segments.

* * * * *